Sept. 20, 1932.  A. O. MACKIN  1,877,924
AUTOMATIC TRAIN LINE COUPLER
Filed Dec. 17, 1930   6 Sheets-Sheet 1
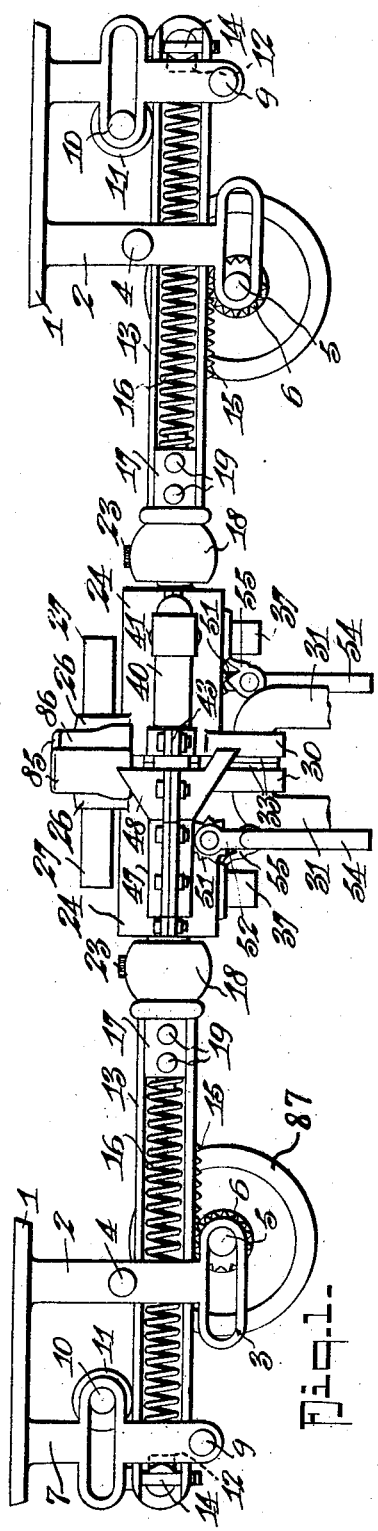
INVENTOR
*A. O. Mackin*
BY
*Albert E Dietrich*
ATTORNEY Sept. 20, 1932.   A. O. MACKIN   1,877,924
AUTOMATIC TRAIN LINE COUPLER
Filed Dec. 17, 1930    6 Sheets-Sheet 2
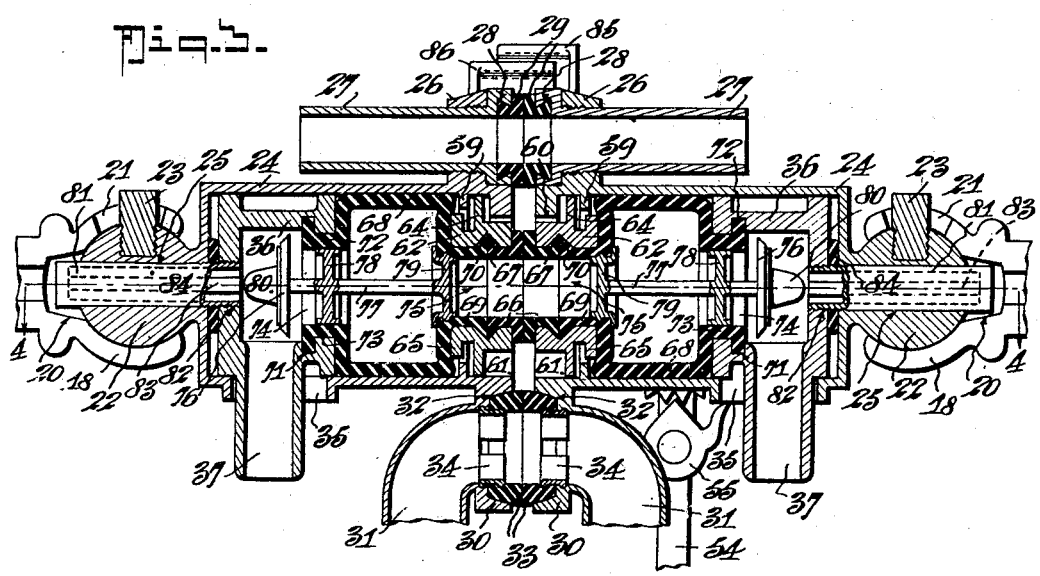
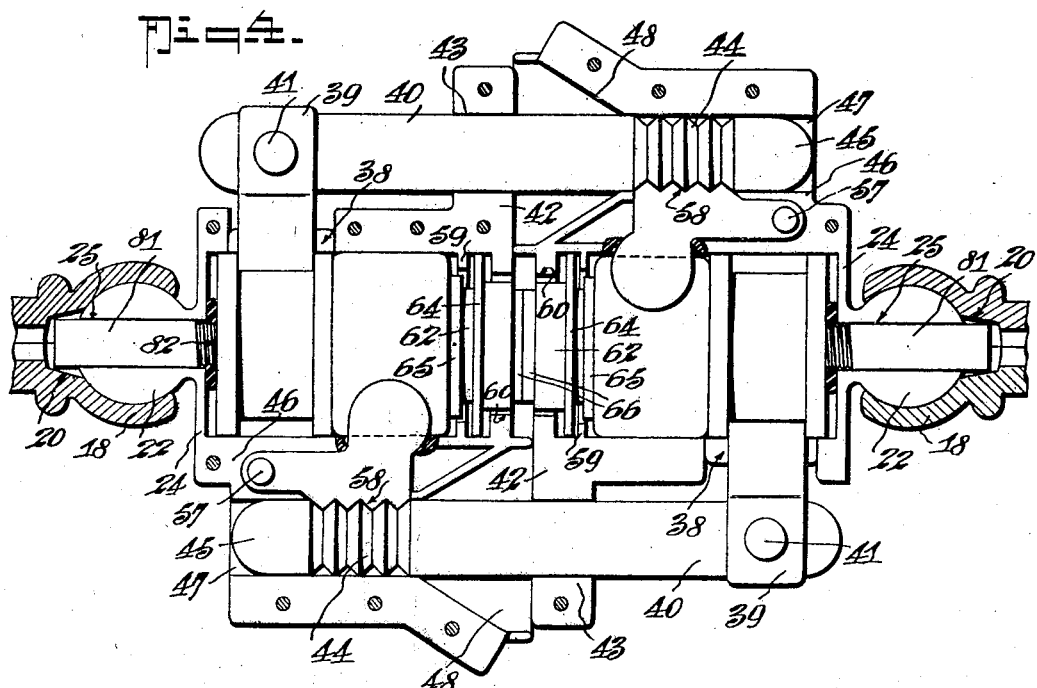
INVENTOR
A. O. Mackin.
BY
ATTORNEY

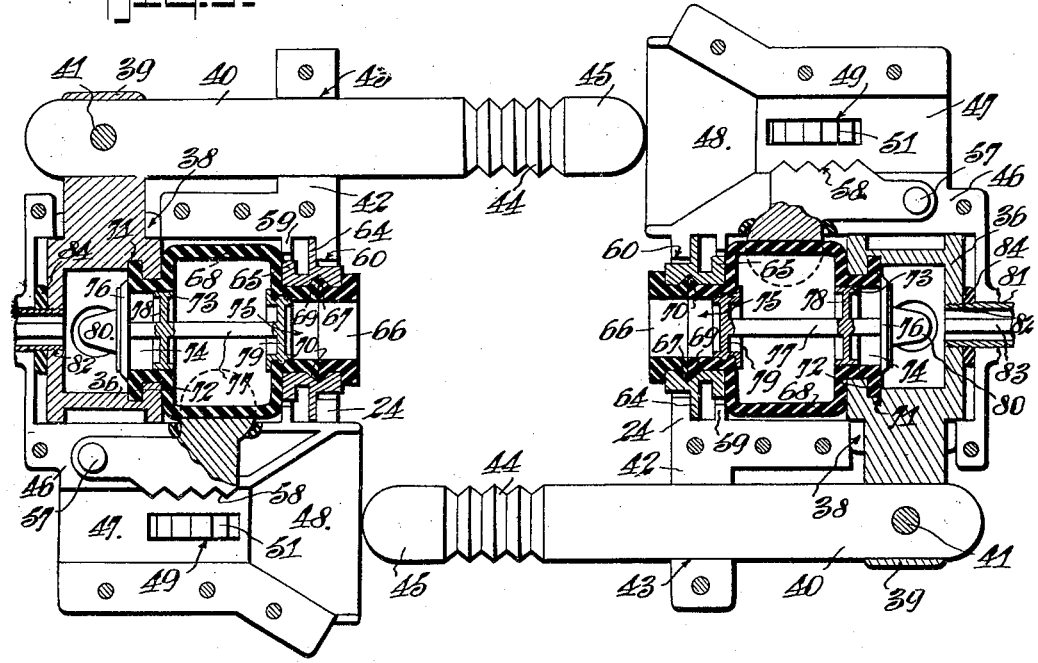

Sept. 20, 1932. A. O. MACKIN 1,877,924
AUTOMATIC TRAIN LINE COUPLER
Filed Dec. 17, 1930 6 Sheets-Sheet 4
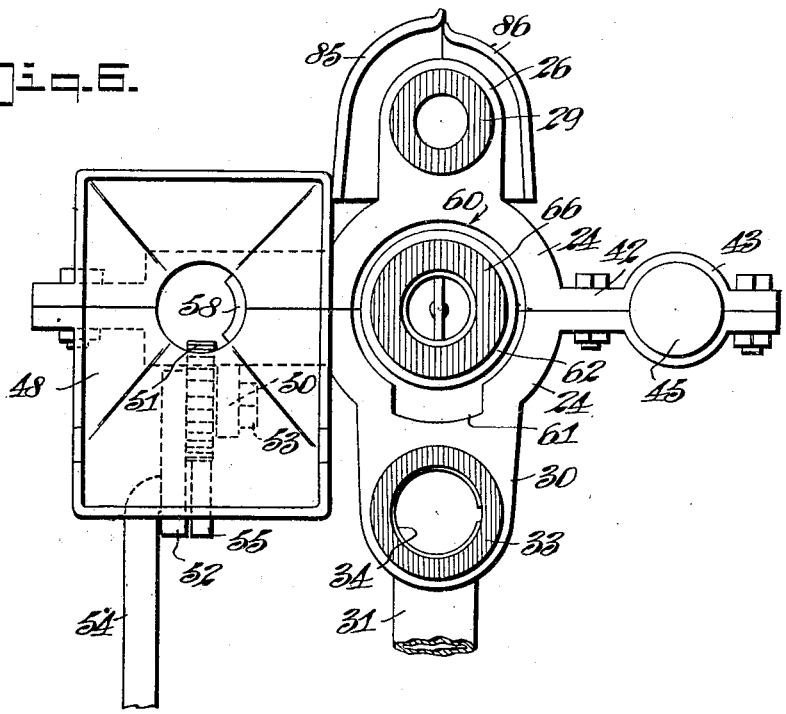
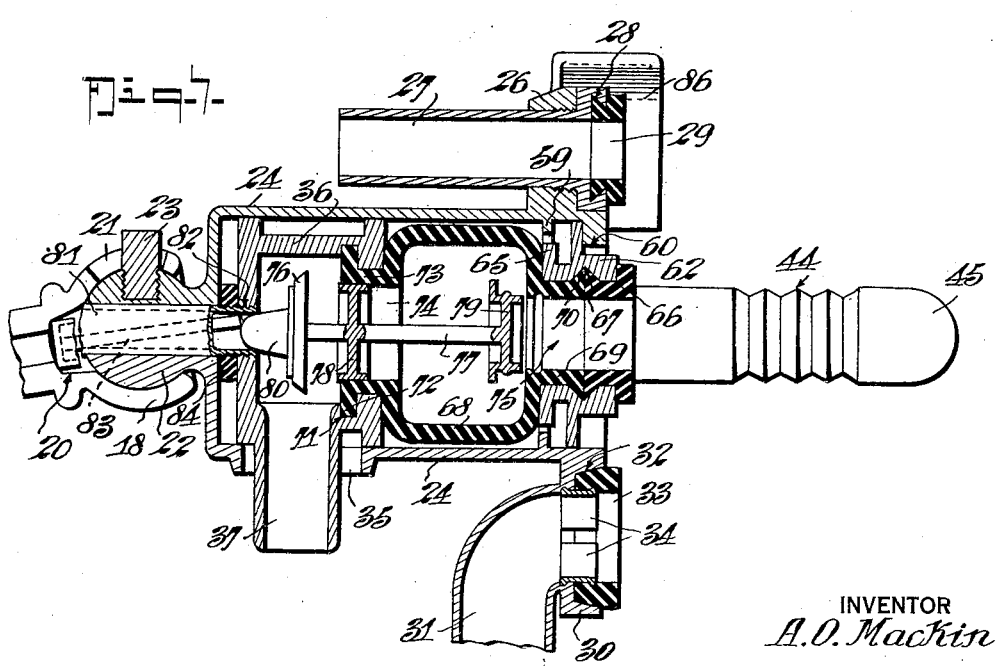
INVENTOR
A. O. Mackin.
BY
ATTORNEY Sept. 20, 1932.  A. O. MACKIN  1,877,924
AUTOMATIC TRAIN LINE COUPLER
Filed Dec. 17, 1930  6 Sheets-Sheet 5
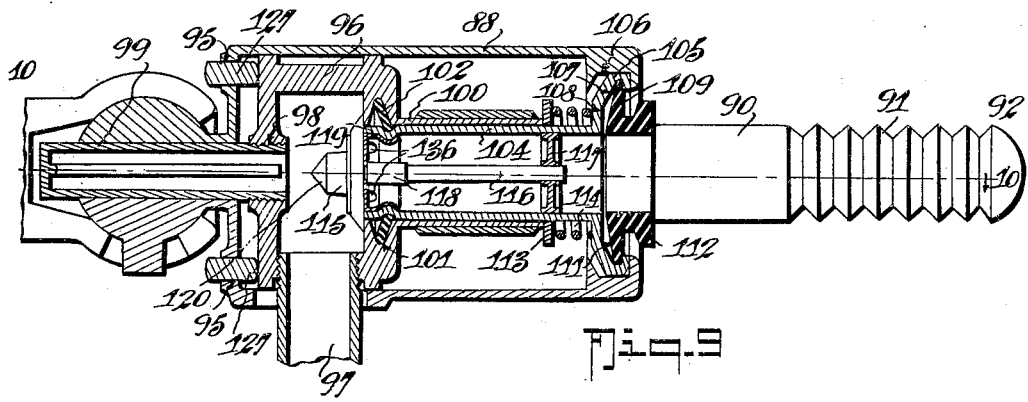
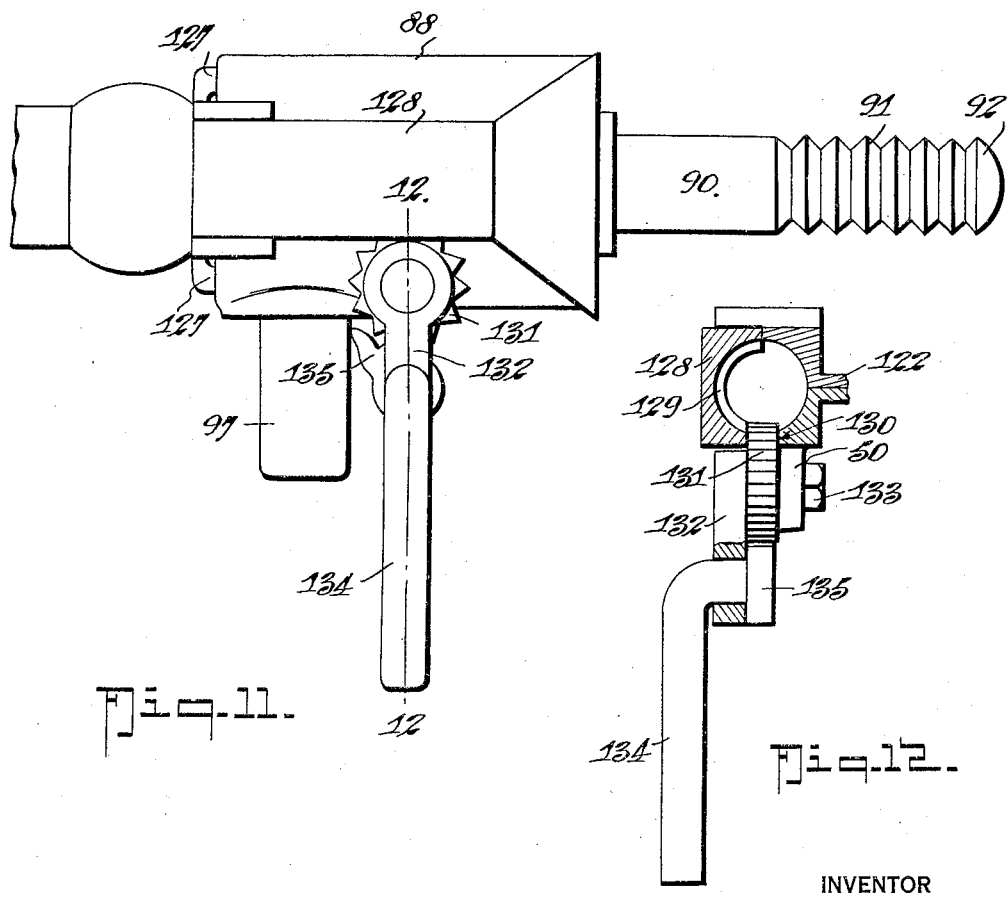
INVENTOR
A. O. Mackin.
BY
Albert E. Dieterich
ATTORNEY

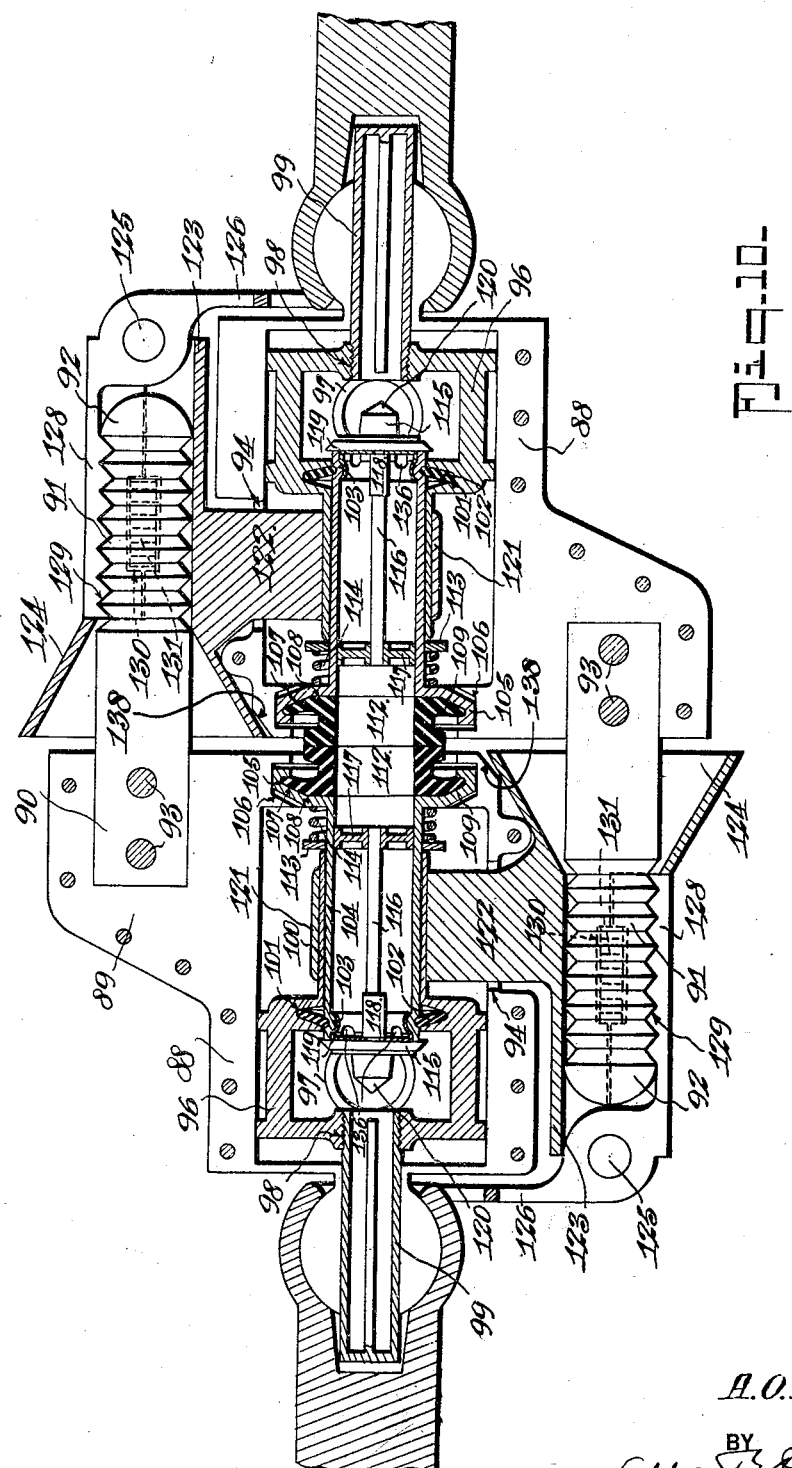

Patented Sept. 20, 1932

1,877,924

UNITED STATES PATENT OFFICE

ALBERT O. MACKIN, OF JOHNSTOWN, PENNSYLVANIA

AUTOMATIC TRAIN LINE COUPLER

Application filed December 17, 1930. Serial No. 503,072.

My invention relates to the art of train line couplers for effecting an automatic coupling and uncoupling of air brake lines, air signal lines, and steam lines between the cars of a train and between the cars and the engine.

The invention particularly has for an object to provide a fully automatic train line coupler which will materially reduce the time required to couple and uncouple train line hose in making up trains and which will, at the same time, eliminate the danger to train crew now so common in the ordinary manually actuated couplers, the connection of train line hose being at present one of the most hazardous operations that trainmen have to meet.

Further, it is an object to provide an automatic coupler of the character specified in which the sealing together of the contact ends of air lines at the adjacent couplers will be effected by the positive pressure of the train line air itself so as to prevent fluid leaks.

Further, it is an object of my invention to provide a single coupler for the air brake line, the signal air line and the steam line of passenger cars, so constituted that the three will be automatically coupled and uncoupled at the same time.

Further it is an object of the invention to utilize the fluid pressure in one or more of the train hose lines (which are to be coupled by the device) for first locking securely mechanically the pair of coupler heads together and then, secondly, for producing the sealing or squeezing pressure which holds the end faces of the train line tubes of one coupler so tightly to corresponding tube ends of the other coupler that fluid leaks in the several lines are prevented.

Further, it is an object of the invention to provide means whereby the air brake train line ends will come into coupling contact before the ends of the signal air lines or the steam lines do, so that the locking pressure may be firmly established by the time the said signal air and steam lines are coupled together, thus avoiding incomplete sealing of the various line ends.

Further, it is an object to provide means whereby the coupler members may be separated sufficiently for the purpose of replacing leaky gaskets without the necessity of "breaking" a train, thereby permitting replacements to be made on the road in a minimum time.

Further, it is an object to provide a safety device cooperatively associated with the coupler proper for the purpose of automatically releasing train line air to set the brakes immediately after a train leaves the rails and before the train draft coupling parts have separated.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a side elevation of the supporting means and a pair of couplers supported thereby and embodying the invention.

Figure 2 is a plan view of the couplers shown in Figure 1.

Figure 3 is a central vertical longitudinal section on the line 3—3 of Figure 2.

Figure 4 is a horizontal section and part plan on the line 4—4 of Figure 3.

Figure 5 is a horizontal section on the line 4—4 of Figure 3 with the parts in the uncoupled position.

Figure 6 is a front elevation of one coupler.

Figure 7 is a view similar to Figure 3 of one coupler showing the action of the safety device and how the air valve may be used temporarily to shut off leakage through the safety device.

Figure 8 is a plan of another embodiment of the invention (one coupler only being shown).

Figure 9 is a vertical longitudinal section on the line 9—9 of Figure 8.

Figure 10 is a horizontal section on the line 10—10 of Figure 9 but showing two couplers engaged.

Figure 11 is a side elevation of the coupler shown in Figure 9, and

Figure 12 is a detail section on the line 12—12 of Figure 11.

In the drawings in which like numerals of reference indicate like parts in all of the figures, 1 represents the base of the coupler support from which the front hanger 2 and the rear hanger depend.

The front hanger 2 is composed of two members laterally spaced apart and having longitudinal slotways 3 for the reception of the spindle 5 of the pinion 6 on which the coupling bar 13 rests with its rack 15 in mesh with the teeth of the pinion. Above the coupling bar 13 a cross bolt 4 is passed through the members through the hanger 2 as shown.

The rear hanger 7 also is composed of two members laterally spaced apart and having longitudinal slotways 8 for the reception of the spindle 10 of the roller 11 that rides on the top of the bar 13, there being a guide bolt 9 located beneath the bar 13 and connecting the members of the hanger 7 together.

12 is a stop lug on one of the members of the hanger 7 which projects into the channel of the bar 13 (this bar being preferably a channel iron) and it is against this lug 12 that the buffer spring 16 bears, the other end of the spring taking over a lug on the end of the shank 17 of the socket 18 hereinafter again referred to.

A stop pin 14 passes through the rear ends of the upper and lower flanges of the bar 13 and prevents that bar from being moved out of the hangers by the action of the spring 16 or otherwise.

The shank 17 is secured to the bar 13 by suitable bolts, rivets or other fastening devices 19 so as to effect a rigid mounting of the socket member 18 on the bar 13. The socket member 18 has a tapered hole 20 into which the safety tube 81, that is carried by the ball 22, projects.

The socket 18 has a stop pin slot 21 in which the stop pin 23, which is carried by the ball 22, works so as to prevent swivelling of the coupler on its longitudinal axis.

24 designates the coupler casing which is preferably of cylindrical form in its body part and from the rear of which the ball 22 projects. The casing 24 is made in upper and lower halves suitably secured together for purposes of assembly and replacement of internal parts when necessary.

The ball 22 has a passageway 25 through it in which the safety tube 81 lies.

At the front of the casing 24 there is formed on its top a supporting lug 26 for the air signal line nipple 27 which is threaded into the lug and has a flange provided with a gasket groove 28 to hold the gasket 29 in place.

On the under side the casing 24 is provided with a supporting lug 30 for the steam line coupler, from which lug the steam line nipple 31 depends. The lug 30 has a gasket seat 32 for the reception of the gasket 33 which is held in place by the holding clip 34 that engages grooves in the gasket and lug respectively. It should, of course, be understood that the lugs 26 and 30 may be omitted when only the air line for the brakes is to be automatically coupled.

The casing 24 has an elongated opening 35 in its bottom through which the nipple portion 37 of the slidable hollow piston 36 projects, the piston 36 being movable along the axis of the casing 24 within the limits of the slot 35. The casing 24 is also provided with a lateral opening 38 for the socketed head 39 that projects from the piston 36, and in the socket of which the coupling pin 40 is suitably secured as at 41. The coupling pin also has slidable movement in a bearing 43 carried by a bracket 42 extending laterally from the casing 24.

The pin 40 has a toothed or serrated portion 44 adjacent its penetrating end 45 to cooperate with the toothed portion 58 of a latch device which is pivoted at 57 to a bracket 46 extending laterally from the casing 24 and carrying a socket element 47 having a flared mouth 48 for the reception of the pin 40 of the opposing coupler head. The socket element 47 has a slot 49 in its bottom through which a toothed or star wheel 51 projects so as to engage the toothed or serrated portion 44 of the inserted pin for a purpose presently to be explained.

Depending from the casing 24 is a lug 50 in which is secured a bearing pin 53 on which is loosely hung a lever section 52. 54 is a lever section pivoted to the lever section 52 and carrying rigidly a dog 55 that is adapted to engage the star wheel 51 which is loosely mounted on the bearing pin 53, the arrangement being such that when the lever 54 is pulled in one direction the dog 55 will engage a tooth of the star wheel 51 so that the star wheel may be rotated to cause movement of the pin 40, in the socket 47 for the purpose of separating the coupler heads in order to enable replacement of a worn gasket when required.

The cylindrical casing 24 has an inner flange 59 and a front aperture 60, the aperture 60 being of a diameter to produce a flange against which the front flange 64 of a movable fitting 62 may rest, the movable fitting having a rear flange 65 that will work in the opening of the flange 59.

A drainage groove 61 is provided in the front of the casing 24.

The fitting 62 is provided with a V-shaped groove for the reception of a half V-shaped flange 67 of the gasket 66 and the half V-shaped flange 70 of the neck 69 of the bulb 68. The bulb 68 is of flexible and expansible material such as rubber or rubber and fabric composition and is provided with a flange 72 to fit the groove 71 in the slidable piston 36. The bulb 68 has a rear neck 73 which carries the flange portion 72 and provides a rear passage 74 to effect communication between the interior of the slidable piston 36 and the interior of the bulb. The front neck 69 of the bulb is also provided with a passage 75 that lines up with the opening in the gasket 66.

76 is an air shut-off valve (which takes the place of the angle cock now used in air brake systems of the Westinghouse type), the valve 76 having a stem 77 and spider guide 78, the latter being located in the passage 74 of the neck 73 in which it is movable. The stem 77 also carries an anchor 79 which is held in the neck opening 75 with retaining friction so that as the neck 70 moves toward and from the neck 73, as will be later explained, the anchor 77 will move with the neck 70 to unseat and seat the valve 76.

The valve 76 carries a nose 80 which is adapted to seal the open end of the fragile or safety tube 81 at times as will be later more clearly explained, and in order to prevent the nose 80 from entering the safety tube under normal conditions, the tube 80 is provided with an internal stem 83 that projects into the chamber of the piston 36 a sufficient distance to prevent the nose 80 from plugging the tube when the valve is open under ordinary or normal conditions. The safety tube 81 is threaded at 82 into the piston 36 so that by screwing the tube into or out of the piston to greater or lesser degrees the relation of the breakable end of the tube to the walls of the tapered hole 20 may be varied so as to cause breakage to occur when the axis of the coupler head is thrown out of alignment with the axis of the coupler bar beyond a predetermined degree. 84 is a cushion.

85 and 86 are snow shields or hoods, 85 being the outer half and 86 the inner half, it being understood that these shields on the respective coupler heads inter-project when the coupler heads come together.

So far as described, the operation of the embodiment of my invention illustrated in Figures 1 to 7 inclusive is as follows:

Assume a train equipped with my invention is to be coupled. Normally the parts of the coupler are in the position shown in Figure 5. Train line air pressure is present in the piston 36 and tube 81, which holds valve 76 closed. Since air within the bulb 68 is at atmospheric pressure the walls of the bulb will not be under tension.

Now, as the couplers of the opposing cars come together the pin 40 of one will enter the socket 48 of the other, forcing back the latches which have the teeth 58 until the said teeth register with those 44 of the pins 20. In approaching the coupled position it will be observed that the gaskets 66 of opposed couplers contact before the gaskets 29 and 30 do (if the coupler is designed for passenger train service, the signal air and steam lines are automatically coupled, otherwise these parts are omitted).

Upon gaskets 66 coming into engagement with one another further coupling pressure causes the necks 70 to move inwardly and consequently push the valves 76 off their seats, thus allowing train line air to flow into the bulbs 68, thereby expanding the same, and through the saddles 56 applying holding pressure at the teeth 58 against the teeth 44. At the same time the train line pressure is established in the bulbs 68 of opposing couplers, the train line air tends to force apart the pistons 36 and fittings 62 of each coupler unit, thus causing a sealing or contacting pressure to be applied to the opposing surfaces of the adjacent gaskets 66 which prevent air leakage at this place.

In uncoupling, the coupler heads are pulled apart by the separating cars which immediately effects a reduction of pressure in the bulbs 68 allowing them to contract to normal dimensions and at the same time permits the valves 76 again to seat and hold the train line pressure in pistons 36.

Should a gasket be found to leak it is not necessary to uncouple the train to get at it for replacement. The brakeman may simply separate the coupler heads either by turning a hand wheel 87 on the shaft 5 and moving the bar 13 back, or by actuating the levers 54 to push the pins 40 out of their sockets 47 far enough to enable the gasket to be exposed.

In Figures 8 et seq., I have illustrated another embodiment of my invention in which telescopic metal cylindrical parts take the place of the expansible bulb, so as to reduce the use of rubber or elastic composition to a minimum. In these figures I have shown the coupler designed only for coupling the air brake lines, but it is obvious that the air signal lines and the steam line coupling attachments 26 and 30, etc. also may be used in this embodiment. Since the addition of the parts 26, 30, etc. seems obvious after inspection of Figure 3, illustration thereof in the modified form of the invention shown in Figures 8 et seq. is thought to be unnecessary.

Referring now to the embodiment shown in Figures 8 et seq. it will be observed that 88 designates the cylindrical casing which is provided with a lug 89 in which the coupler pin 90 is rigidly secured as at 93 in any suitable manner, the pin having the toothed portion 91 adjacent its penetrating end 92.

The casing 88 in one side is provided with a horizontal slot 94 through which the web 122, hereinafter again referred to, projects. The casing is also provided at its inner end with upper and lower slots 95 into which project the fingers 127 of the latching lever 126 hereinafter again referred to.

A piston 96 is slidably mounted in the casing and carries the nipple 97 to which the train line of the air brake system is connected. The piston 96 has a tapped hole 98 for the reception of the safety tube 99, the construction of which tube is similar to that of the tube 81 and further description thereof is thought to be unnecessary here.

The piston 96 has a sleeve 100 that projects forwardly toward the open end of the cylinder 88 and receives a sleeve 104 of a sliding fitting 105, the latter having a limited sliding movement in the groove 106 of the open end of the casing and forms a closure for said open end.

The piston 96 has an approximately V-shaped gasket groove 101 to receive the sealing gasket disk 102, the latter also projecting into the concaved part of the concavo-convex portion 103 of the sleeve 104.

The fitting 105 is provided with a gasket holding recess, the back walls 107 and 108 of which are located in angular relation as shown to cooperate with the straight back wall 111 of the gasket 109, the latter having a flange held in the fitting 105 with its back or contacting wall 111 opposing the walls 107 and 108. This construction gives the appearance in cross section of a triangle, the hypotenuse of which is formed by the contacting face of the wall 111 while the two sides are formed by the contacting faces of the walls 107 and 108. This gives a degree of flexibility in the washer which allows for momentary gaps due to vibration and other disturbances in the running train. The gasket 109 is provided with a flange 112 which is adapted to contact the corresponding flange of the gasket 109 of the opposing coupler to seal the connection.

113 is a thrust washer which is fitted on the sleeve 104 and rests against the end of the sleeve 100, a thrust spring 114 being provided between the washer 113 and the wall 108 of the fitting 105.

115 designates the air valve whose stem 116 carries a spider 117 that fits the interior of the sleeve 104 with retaining friction. The stem is also provided with a guide 118 formed as a part of the spring clip 119 which cooperates with the convexed portion of the concavo-convexed portion 103 of the cylinder 104 to hold the valve in that cylinder. The cylinder 104 is also provided with edge openings 136 for the passage of air from the piston 96 into the sleeve 104 when the valve 115 is unseated.

The valve 115 carries a nose or plug 120 for the safety tube 99 to operate in a manner later to be explained.

121 is a collar in which the sleeve 100 slides, the collar being rigid with the web 122 that passes through the slot 94 in the casing 88. The web 122 at its outer extremity carries a half socket member 123 that has a flared mouth 124 and cooperates with the half socket member 128 formed as a part of the lever 126 and carrying the teeth 129 to cooperate with the teeth 91. The lever 126 is fulcrumed at 125 to the half socket 123 as shown.

The socket formed by the two half socket members 123 and 128 has a slot 130 in its bottom for the toothed wheel 131 which is mounted on the bearing pin 133, there being a lever section 132 also mounted on the bearing pin, to which section a second lever section 134 is pivoted and carries a dog 135 to engage the star or toothed wheel 133 at times. The construction of the parts 131 to 135 inclusive may be the same as the parts 53 to 55 inclusive in the preceding embodiment of the invention and the operation and purpose are the same.

It is also to be noted that the flared mouth 124 is adapted to engage the bevelled portion 138 of the cylinder 88 as a stop, there being a slight longitudinal movement of the web 122 in the slot 94 provided.

The operation of the second embodiment of my invention is essentially the same as that of the first embodiment, the principal difference being that instead of utilizing the lateral expansion of the flexible bulb for forcing the toothed latch into engagement with the coupler pin, the longitudinal movement of the piston 96 is taken advantage of to force the fingers 127 outwardly and thus rock the lever 126 so as to bring the teeth 129 into holding engagement with the teeth 91 of the opposed coupler pin.

When two couplers come together the impact will cause the fitting 105 to move inwardly, thus forcing the valves 115 off their seat and permitting the air to flow from the pistons 96 through the notches 136 into the sleeves 104 and thereby establish train line air pressure from the piston 96 of one coupler head to the piston 96 of the adjacent head. This causes the pistons 96 to move inwardly (apart) and applies pressure to the respective fingers 127 of the latch levers. Uncoupling of the heads as the train is pulled apart releases the pressure in the sleeves 104 and permits valves 115 to seat again, in which process of seating they are assisted by the springs 114.

The safety feature of my invention is the same in both embodiments. Therefore a description of its operation has been left until now.

In the first place it should be stated that the tubes 81 or 99 as the case may be are made strong enough to support the weight of the coupler heads so that they will be held sufficiently near a horizontal position to enable the coupler pins to find their ways into the flared mouths of the sockets with which they cooperate as the coupler heads come together. The safety tubes are so set that after the coupler heads are connected should a car become derailed or tilt over or drop, whereby a greater angle of inclination between the axes of the heads and the axes of their supporting sockets is attained, the end of one or both safety tubes will be sheared off by the movement of the ball in the socket, or rather of the socket around the ball, thus releasing train line air through longitudinal openings or passages 137 in the socket members. This reduces train line pressure sufficiently to set the brakes immediately and bring the train to a stop before the cars become uncoupled.

If the train crew have insufficient time at their disposal to dismount a coupler head on which the safety tube has become broken and replace the tube with a new one, the brakeman simply separates the couplers by means of the hand wheel 87 and by the use of a bar or spike he forces the valve 76 or 115, as the case may be, out of its mounting to bring the nose 80 or 120, as the case may be, into the entrance of the broken tube and plug the same. This will stop the flow of air through the safety tube when the coupler is engaged with the coupler of an opposing car and permit the train line pressure to build up in the car having the broken safety tube. Of course, when that car is uncoupled the train line pressure will pass out from 96 through 104 but that will be of no consequence as the car will then be ready for repairs.

Until my coupler has been adopted as standard equipment on all cars, it will be advisable to provide a branch from the train line in which an angle cock and the ordinary coupler now in use is provided so that if a car having one of my couplers is to be coupled to a car not having one of the couplers the old method of coupling may be employed.

After all cars, however, are equipped with my automatic coupler the use of hand couplers of any kind will become unnecessary.

From the foregoing description, taken in connection with the accompanying drawings, it is thought the complete construction, operation and advantages of my invention will be clear to those skilled in the art to which it relates.

What I claim is:

1. In train line couplers wherein is provided a pair of opposing coupler heads; said heads each including a coupling pin and a coupling pin socket, a train line terminal having a coupling face, a shut-off valve for said terminal, means operative upon the coming together of the train line terminals of opposing heads for opening the shut-off valve to establish train line pressure through the coupler heads and means operated by train line pressure for securing the heads together.

2. In train line couplers wherein is provided a pair of opposing coupler heads; said heads each including a coupling pin and a coupling pin socket, a train line terminal having a coupling face, a shut-off valve for said terminal, means operative upon the coming together of the train line terminals of opposing heads for opening the shut-off valve to establish train line pressure through the coupler heads and mean operated by train line pressure for securing the heads together, and maintaining sealing contact between the coupling faces of said train line terminals.

3. In train line couplers wherein is provided a pair of opposing coupler heads, each including a terminal of a train line of an air brake system, interprojecting elements, those of one head cooperating with those of the other to hold the terminal of one coupler in register with the terminal of the opposing coupler when the heads are brought together, each head also including an air shut-off valve, and means for first opening said valve to establish an air line communication between the couplers and then by the action of the air secure said interprojecting elements together.

4. In train line couplers wherein is provided a pair of opposing coupler heads, each head including a terminal of a train line of an air brake system, interprojecting elements, those of one head cooperating with those of the other to hold the terminal of one coupler in register with the terminal of the opposing coupler when the heads are brought together, each head also including an air shut-off valve, and means for first opening said valves to establish an air line communication between the couplers and then by the action of the air secure said interprojecting elements together, each coupler head also including a coupling terminal of an air signal line.

5. In train line couplers wherein is provided a pair of opposing coupler heads, each head including a terminal of a train line of an air brake system, interprojecting elements, those of one head cooperating with those of the other to hold the terminal of one coupler in register with the terminal of the opposing coupler when the heads are brought together, each head also including an air shut-off valve, and means for first opening said valve to establish an air line communication between the couplers and then by the action of the air secure said interprojecting elements together, each coupler head also including a coupling terminal of a steam line.

6. In train line couplers wherein is provided a pair of opposing coupler heads, each head including a terminal of a train line of an air brake system, interprojecting elements, those of one head cooperating with those of the other to hold the terminal of one coupler in register with the terminal of the opposing coupler when the heads are brought together, and means operated by the train line air for interlocking said interprojecting elements, each coupler head also including one other coupling terminal, the coupling terminals being so positioned that the train line air terminals of opposing heads will engage in advance of the engagement of the other coupling terminals.

7. In train line couplers wherein is provided a pair of opposing coupler heads, each head including a terminal of a train line of an air brake system, interprojecting elements, those of one head cooperating with those of the other to hold the terminal of one coupler in register with the terminal of the opposing coupler when the heads are brought together, each head also including an air shut-off valve, and means for first opening said valve to establish an air line communication between the couplers and then by the action of the air secure said interprojecting elements together, each coupler head also including one other coupling terminal, the coupling terminals being so positioned that the train line air terminals of opposing heads will engage in advance of the engagement of the other coupling terminals.

8. In an air brake system; a pair of automatic couplers each including a head comprising a cylinder, a hollow piston within the cylinder connected to the train line and having an outlet, a fitting in said cylinder, a terminal gasket held in said fitting, expansible means between said fitting and said piston, a valve for closing said outlet to hold terminal line air pressure in said piston when the coupler is not in use, a pin and a socket element for effecting mechanical connection between the pairs of couplers, and means operated by the train line air upon the coming together of the coupler heads of a pair for holding said pin and socket elements together.

9. In an air brake system; a pair of automatic couplers each including a head comprising a cylinder, a hollow piston within the cylinder connected to the train line and having an outlet, a fitting in said cylinder, a terminal gasket held in said fitting, expansible means between said fitting and said piston, a valve for closing said outlet to hold terminal line air pressure in said piston when the coupler is not in use, a pin and a socket element for effecting mechanical connection between the pairs of couplers, and yieldable means operated by the train line air upon the coming together of the coupler heads of a pair for holding said pin and socket elements together.

10. In air brake systems wherein is provided a pair of automatic couplers; said couplers comprising heads with train line terminals, pin and socket elements to hold the terminals of the heads in register when the couplers come together; coupler bars on which each head is mounted; a joint between each coupler head and its bar having a limited angular movement, shut-off valves to prevent air escape through the train line terminals when the couplers are separated and to permit air to flow from one head to the other head when the couplers are together; and means operable upon the establishment of an excessive angular movement in said joint for releasing train line air to set the brakes.

11. In air brake systems wherein is provided a pair of automatic couplers; said couplers comprising heads with train line terminals, pin and socket elements to hold the terminals of the heads in register when the couplers come together; coupler bars on which each head is mounted; a joint between each coupler head and its bar having a limited angular movement; shut-off valves to prevent air escape through the train line terminals when the couplers are separated and to permit air to flow from one head to the other head when the couplers are together; and means operable upon the establishment of an excessive angular movement in said joint for releasing train line air to set the brakes, said means comprising a breakable tube in communication with the train line air in the coupler heads.

12. In air brake systems wherein is provided a pair of automatic couplers; said couplers comprising heads with train line terminals, pin and socket elements to hold the terminals of the heads in register when the couplers come together; coupler bars on which each head is mounted; a joint between each coupler head and its bar having a limited angular movement; shut-off valves to prevent air escape through the train line terminals when the couplers are separated and to permit air to flow from one head to the other head when the couplers are together; and means operable upon the establishment of an excessive angular movement in said joint for releasing train line air to set the brakes, said means comprising a breakable tube in communication with the train line air in the coupler heads, and means for mounting said valve whereby it may be caused to close said tube if desired.

13. In train line couplers wherein is provided a pair of cooperating coupler heads carrying air line terminals having contacting gaskets and wherein means to effect mechanical interengagement of the heads is provided; means yieldable to lock the heads together, means to effect a separation of the heads against the action of said yieldable means while maintaining the coupled relation of the train for the purposes described.

14. In automatic train line couplers, a head comprising a cylinder, a hollow piston slidable within the cylinder and having a nipple for connection with the train line pipe of an air brake system, said cylinder having its outer end provided with an opening, a slidable fitting located within the cylinder, a terminal gasket held in said fitting and projecting through said opening, an expansible bulb within the cylinder having a neck anchored to said piston and having another neck anchored to said fitting, said bulb and its neck constituting an air passage from said piston to said fitting, a shut-off valve carried by said bulb to shut off air flow from the piston to the bulb when the coupler heads of a pair are separated, said heads each including a coupling pin and a socket member, the pins having toothed portions and a toothed latch carried by each cylinder and operable by the expansion of its bulb for securing the coupling pins of opposed couplers in their respective sockets.

15. In automatic train line couplers, a head comprising a cylinder, a hollow piston slidable within the cylinder and having a nipple for connection with the train line pipe of an air brake system, said cylinder having its outer end provided with an opening, a slidable fitting located within the cylinder, a terminal gasket held in said fitting and projecting through said opening, an expansible bulb within the cylinder having a neck anchored to said piston and having another neck anchored to said fitting, said bulb and its neck constituting an air passage from said piston to said fitting, a shut-off valve carried by said bulb to shut off air flow from the piston to the bulb when the coupler heads of a pair are separated, said heads each including a coupling pin and a socket member, the pins having toothed portions and a toothed latch carried by each cylinder and operable by the expansion of its bulb for securing the coupling pins of opposed couplers in their respective sockets, and means for forcing said pins outwardly in their sockets to expose the engaging parts of the coupler heads for the purposes specified.

16. In automatic train line couplers, a head comprising a cylinder, a hollow piston slidable within the cylinder and having a nipple for connection with the train line pipe of an air brake system, said cylinder having its outer end provided with an opening, a slidable fitting located within the cylinder, a terminal gasket held in said fitting and projecting through said opening, an expansible bulb within the cylinder having a neck anchored to said piston and having another neck anchored to said fitting, said bulb and its neck constituting an air passage from said piston to said fitting, a shut-off valve carried by said bulb to shut off air flow from the piston to the bulb when the coupler heads of a pair are separated, said heads each including a coupling pin and a socket member, the pins having toothed portions and a toothed latch carried by each cylinder and operable by the expansion of its bulb for securing the coupling pins of opposed couplers in their respective sockets, and means to mount a coupler head on a car, which means includes an articulated joint, a breakable tube carried by said piston and cooperatively associated with said joint for releasing train line air to set the brakes upon excessive movement in the joint.

17. In automatic train line couplers, a head comprising a cylinder, a hollow piston slidable within the cylinder and having a nipple for connection with the train line pipe of an air brake system, said cylinder having its outer end provided with an opening, a slidable fitting located within the cylinder, a terminal gasket held in said fitting and projecting through said opening, an expansible bulb within the cylinder having a neck anchored to said piston and having another neck anchored to said fitting, said bulb and its neck constituting an air passage from said piston to said fitting, a shut-off valve carried by said bulb to shut off air flow from the piston to the bulb when the coupler heads of a pair are separated, said head also including a coupling pin and a socket member, the pin having a toothed portion and a toothed latch carried by said cylinder and operable by the expansion of said bulb for securing the coupling pins of opposed couplers in their respective sockets, said valve having provisions to close said tube at times for the purposes specified.

18. In automatic train line couplers, wherein a pair of coupler heads have line terminal gaskets adapted to be brought into contact upon the coupler heads being brought together; snow and sleet hoods carried by each coupler head, each of said sleet hoods comprising two members, one smaller than the other, the hood member of one coupler head adapted to project into the hood member of the other coupler head, the smaller members lying projected within the compass of the larger members when the coupler heads have been brought into contact, said hoods overlying the gaskets for the purposes described.

19. In train line couplers wherein is provided a pair of opposing coupler heads; each including a terminal of a train line of an air brake system, interprojecting elements, those of one head cooperating with those of the other to hold the terminal of one coupler in register with the terminal of the opposing coupler when the heads are brought together, and means operated by the train line air for interlocking said interprojecting elements, said means including a latch lever and mechanism on the coupler heads operable by the train line air for moving said lever to hold the interprojecting elements together.

20. In train line couplers wherein is provided a pair of opposing coupler heads; each including a terminal of a train line of an air brake system, interprojecting elements, those of one head cooperating with those of the other to hold the terminal of one coupler in register with the terminal of the opposing coupler when the heads are brought together, each head also including an air shut-off valve, and means for first opening said valve to establish an air line communication between the couplers and then by the action of the air secure said interprojecting elements together, said means including a latch lever and mechanism in the coupler heads operable by the train line air for moving said lever to hold the interprojecting elements together.

21. In train line couplers wherein is provided a pair of opposing coupler heads; a head which includes a casing and coupling elements for mechanical connection to similar elements of an opposing head, a piston in said casing having a passage for communication at one end with a train line pipe, a shut-off valve controlling the other end of said passage, a terminal member, a duct between the valve end of said passage and said terminal member, said terminal member cooperating with a similar terminal member on an opposed coupler head, said duct comprising telescoping elements, one of which is anchored in said casing and the other is carried by said piston.

22. In train line couplers wherein is provided a pair of opposing coupler heads; a head which includes a casing and coupling elements for mechanical connection to similar elements of an opposing head, a piston in said casing having a passage for communication at one end with a train line pipe, a shut-off valve controlling the other end of said passage, a terminal member, a duct between the valve end of said passage and said terminal member, said terminal member cooperating with a similar terminal member on an opposed coupler head, said duct comprising telescoping elements, one of which is anchored in said casing and the other is carried by said piston, means continuously tending to extend said telescoping elements, and means to mount said valve in said telescoping elements to open and close said passage accordingly as said telescoping elements are extended or contracted.

23. In train line couplers wherein is provided a pair of opposing coupler heads; a head which includes a casing and coupling elements for mechanical connection to similar elements of an opposing head, a piston in said casing having a passage for communication at one end with a train line pipe, a shut-off valve controlling the other end of said passage, a terminal member, a duct between the valve end of said passage and said terminal member, said terminal member cooperating with a similar terminal member on an opposed coupler head, said duct comprising telescoping elements, one of which is anchored in said casing and the other is carried by said piston, means continuously tending to extend said telescoping elements, and means to mount said valve in said telescoping elements to open and close said passage accordingly as said telescoping elements are extended or contracted, and means operable by the movement of said piston under train line air pressure for securing said coupling elements together.

24. In train line couplers, a coupler head comprising a cylinder, a coupler pin secured thereto, a chambered piston movable in the cylinder and having an inlet for communication with a train line pipe, said piston having a sleeve, a shut-off valve controlling fluid flow from the chamber of said piston through said sleeve, a fitting, means anchoring said fitting in said cylinder, said fitting including a sleeve telescoping the sleeve of said piston, means sealing said sleeves against air escape between them, means mounting said valve in the sleeve of said fitting to move with the same, a terminal gasket carried by said fitting and projecting through an opening in the end of said cylinder, a coupler pin socket including a member having a web projecting through a slot in said cylinder, a collar on said web slidably receiving said sleeves, said socket also including a latch lever having a finger projecting into said casing for engagement by said piston whereby to hold a coupler pin in said socket while train line air is passing through connected couplers.

25. In train line couplers, a coupler head comprising a cylinder, a coupler pin secured thereto, a chambered piston movable in the cylinder and having an inlet for communication with a train line pipe, said piston having a sleeve, a shut-off valve controlling fluid flow from the chamber of said piston through said sleeve, a fitting, means anchoring said fitting in said cylinder, said fitting including a sleeve telescoping the sleeve of said piston, means sealing said sleeves against air escape between them, means mounting said valve in the sleeve of said fitting to move with the same, a terminal gasket carried by said fitting and projecting through an opening in the end of said cylinder, a coupler pin socket including a member having a web projecting through a slot in said cylinder, a collar on said web slidably receiving said sleeves, said socket also including a latch lever having a finger projecting into said casing for engagement by said piston whereby to hold a coupler pin in said socket while train line air is passing through connected couplers, means to mount said coupler head, said mounting means including an articulated joint, a safety tube cooperatively associated with said joint and with said piston for limiting the movement in said joint under the weight of the coupler head and for breaking upon the causing of excessive movement in said joint to release train line air from the chamber of said piston.

26. In train line couplers, a coupler head comprising a cylinder, a coupler pin secured thereto, a chambered piston movable in the cylinder and having an inlet for communication with a train line pipe, said piston having a sleeve, a shut-off valve controlling fluid flow from the chamber of said piston through said sleeve, a fitting, means anchoring said fitting in said cylinder, said fitting including a sleeve telescoping the sleeve of said piston, means sealing said sleeves against air escape between them, means mounting said valve in the sleeve of said fitting to move with the same, a terminal gasket carried by said fitting and projecting through an opening in the end of said cylinder, a coupler pin socket including a member having a web projecting through a slot in said cylinder, a collar on said web slidably receiving said sleeves, said socket also including a latch lever having a finger projecting into said casing for engagement by said piston whereby to hold a coupler pin in said socket while train line air is passing through connected couplers, said valve having provisions to close the end of the safety tube when the tube has become broken.

27. In train line couplers, a coupler head comprising a cylinder, a coupler pin secured thereto, a chambered piston movable in the cylinder and having an inlet for communication with a train line pipe, said piston having a sleeve, a shut-off valve controlling fluid flow from the chamber of said piston through said sleeve, a fitting, means anchoring said fitting in said cylinder, said fitting including a sleeve telescoping the sleeve of said piston, means sealing said sleeves against air escape between them, means mounting said valve in the sleeve of said fitting to move with the same, a terminal gasket carried by said fitting and projecting through an opening in the end of said cylinder, a coupler pin socket including a member having a web projecting through a slot in said cylinder, a collar on said web slidably receiving said sleeves, said socket also including a latch lever having a finger projecting into said casing for engagement by said piston whereby to hold a coupler pin in said socket while train line air is passing through connected couplers, means to mount said coupler head, said mounting means including an articulated joint, a safety tube cooperatively associated with said joint and with said piston for limiting the movement in said joint under the weight of the coupler head and for breaking upon the causing of excessive movement in said joint to release train line air from the chamber of said piston, and means carried by said safety tube while unbroken for holding said valve against closing said safety tube.

ALBERT O. MACKIN.